INVENTORS
Edward J. Mellen Jr.
John M. Webb
Robert J. de Fasselle
John A. Dudek

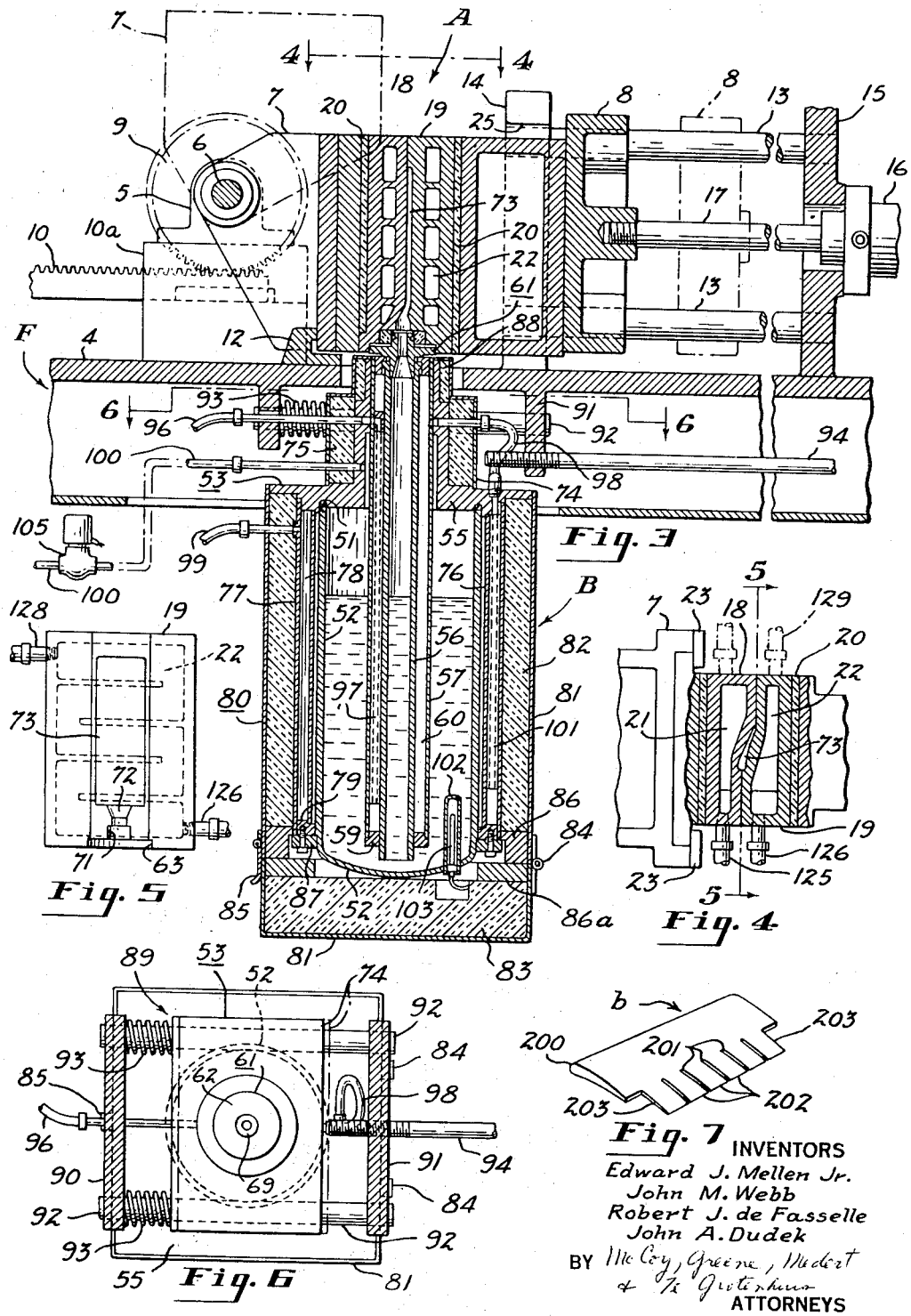

Dec. 5, 1967    E. J. MELLEN, JR., ET AL    3,356,130
INJECTION MOLDING APPARATUS FOR MAKING
CERAMIC CORES OR THE LIKE
Original Filed April 30, 1963      4 Sheets-Sheet 3
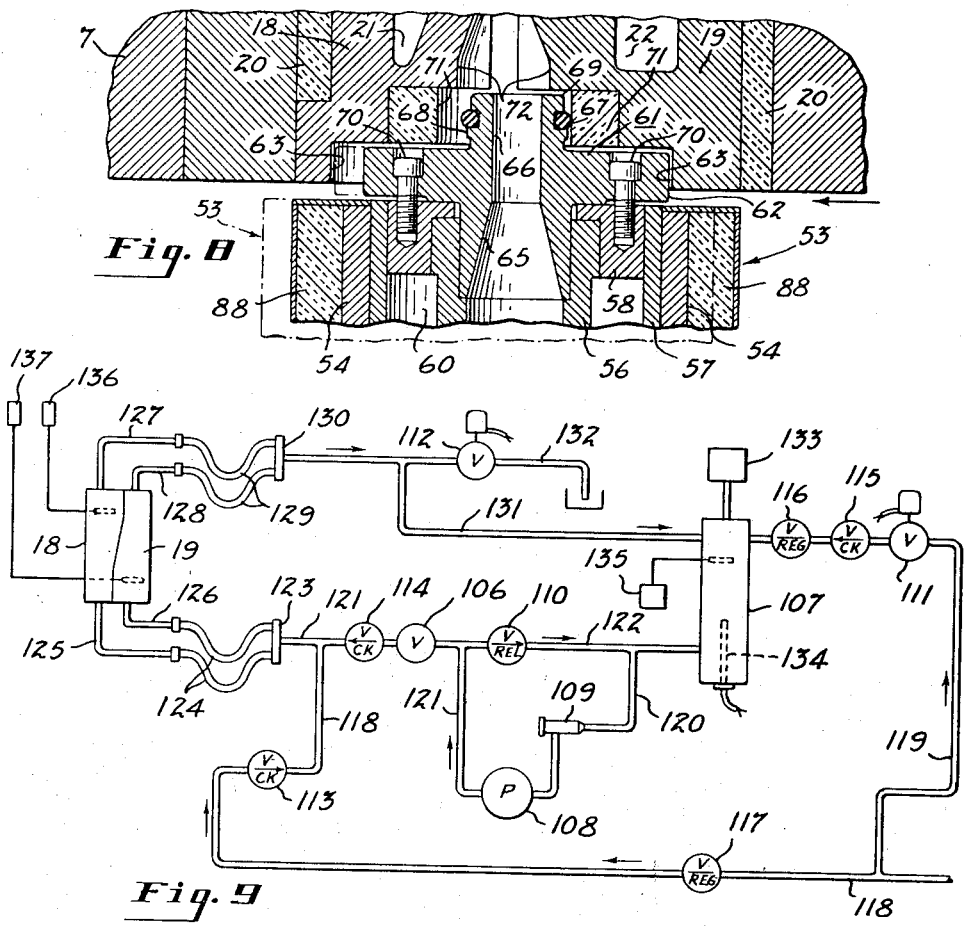
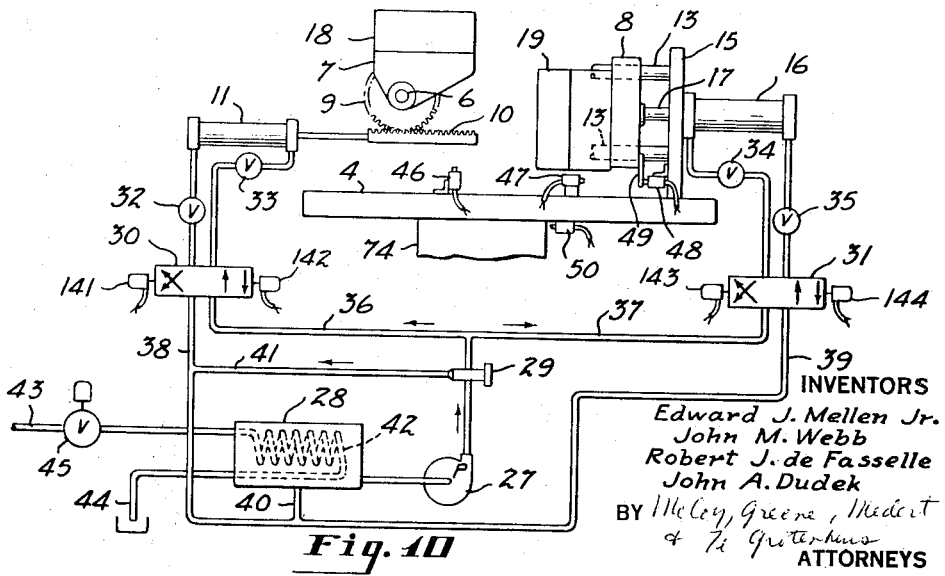
INVENTORS
Edward J. Mellen Jr.
John M. Webb
Robert J. de Fasselle
John A. Dudek
ATTORNEYS United States Patent Office 3,356,130
Patented Dec. 5, 1967

3,356,130
INJECTION MOLDING APPARATUS FOR MAKING CERAMIC CORES OR THE LIKE
Edward J. Mellen, Jr., 2123 Lee Road, East Cleveland, Ohio 44118, John M. Webb, Chagrin Falls, Robert J. de Fasselle, Gates Mills, and John A. Dudek, Euclid, Ohio; said Webb, De Fasselle, and Dudek assignors to said Mellen
Original application Apr. 30, 1963, Ser. No. 276,753, now Patent No. 3,222,435, dated Dec. 7, 1965. Divided and this application Aug. 11, 1965, Ser. No. 478,836
17 Claims. (Cl. 164—233)

ABSTRACT OF THE DISCLOSURE

An apparatus for mass production of ceramic parts having a split die, an insulated vessel for receiving a refrigerated ceramic slurry, a supply tube extending from a point below the level of the slurry to a nozzle at the inlet of the die, means for supplying a high pressure to said slurry to force it through said tube and fill the mold cavity rapidly, refrigerating means for maintaining the slurry at low temperature and for cooling the end of said supply tube adjacent said nozzle, means for swinging one die half to a horizontal position, and means for moving the nozzle to permit opening and closing of the die.

---

This application is a division of our copending application Ser. No. 276,753 filed April 30, 1963, now Patent No. 3,222,435, dated December 7, 1965.

The present invention relates to the manufacture of preformed ceramic mold parts and more particularly to apparatus for making improved ceramic cores and mold halves for the precision investment casting of valves and other metal parts for jet engines, rockets, etc.

Heretofore, preformed ceramic cores and other ceramic mold parts have been employed in conjunction with the "lost-wax" or "frozen mercury" process to produce shell molds for the investment casting of various precision parts. Difficulty has been encountered when trying to produce ceramic cores of very thin cross section or small diameter and a large portion of the cores have been discarded as scrap. Where fine definition was required together with dimensional accuracy, it has been difficult to produce satisfactory cores even with slow and careful procedures. For these reasons the manufacture of certain types of ceramic cores has been very expensive. The number of types of ceramic cores and other ceramic mold parts which could be produced was limited due to the inability to make them in a practical manner.

It has been discovered that the above difficulties are overcome by the process of said copending application Ser. No. 276,753. Said process as performed by the apparatus of the present invention, reduces the amount of liquid in the ceramic slurry, minimizes air pockets in the ceramic cores, mold halves, or other mold parts and improves the surface characteristics thereof. By reducing the number of defective pieces it greatly reduces the cost of certain types of ceramic mold parts having sharp corners, thin sections or special shapes. It permits mass production of ceramic cores or ceramic mold halves to close tolerances with improved quality control which is not possible with previously used methods. At the same time it reduces the need for cleaning of the molds, since the cores or other ceramic articles are firmer than those produced by the previous methods and more easily removed from the mold.

The present invention provides a simple apparatus for performing the process of said copending application without the necessity for substantial change in the existing core molds. By providing a supply tube surrounded by the refrigerated slurry, it is possible to employ mass production techniques without clogging of the tube at the nozzle exit. Such apparatus can increase the rate of production 50 to 100 percent while at the same time improving the quality of the ceramic cores or other ceramic mold parts.

The apparatus of the invention preferably comprises a closed tank, which contains the liquid ceramic slurry and a dry gas, such as nitrogen, above the slurry; refrigerating means for the tank; means for periodically applying a high pressure to the gas in said tank; and a supply tube extending upwardly from a point below the surface of the slurry in the tank to a nozzle at the top of the tank which discharges into a core mold mounted above the tank. The tube may be provided with cooling fins to insure rapid cooling of the slurry near the top of said tube when the injection into the mold is terminated.

An object of the present invention is to provide a practical apparatus for making ceramic cores having thin elongated portions such as ribs, fins, small diameter rods or the like.

Another object of the invention is to increase the rate of production of special types of ceramic cores.

A further object of the invention is to provide a simple, inexpensive and reliable apparatus for producing precision ceramic cores or mold halves having the detail and excellent surface characteristics.

These and other objects, uses and advantages of the invention will become apparent to those skilled in the art from the following description and claims and from the drawings, in which:

FIGURE 3 is a fragmentary longitudinal vertical sectional view showing the main elements of the apparatus on a larger scale, the parts being shown in dot-dash lines in their positions when the platens are retracted;

FIGURE 4 is a fragmentary top view with parts broken away and shown in horizontal section looking in the direction of the arrows 4—4 of FIGURE 3;

FIGURE 5 is an elevational view looking in the direction of the arrows 5—5 of FIGURE 4 showing the construction of one mold half;

FIGURE 6 is a top view looking in the direction of the arrows 6—6 of FIGURE 3, with parts broken away and shown in horizontal section;

FIGURE 7 is a perspective view on a reduced scale showing a modified form of turbine-blade core which may be made by the method of this invention.

FIGURE 8 is a fragementary vertical sectional view on a larger scale showing the construction near the top of the ceramic slurry cell;

FIGURE 9 is a diagrammatic view on a reduced scale showing the heating and cooling system for the mold;

FIGURE 10 is a diagrammatic view on a reduced scale showing the hydraulic system for opening and closing the mold, the parts being shown in their positions when the die halves are retracted.

Figure 1:
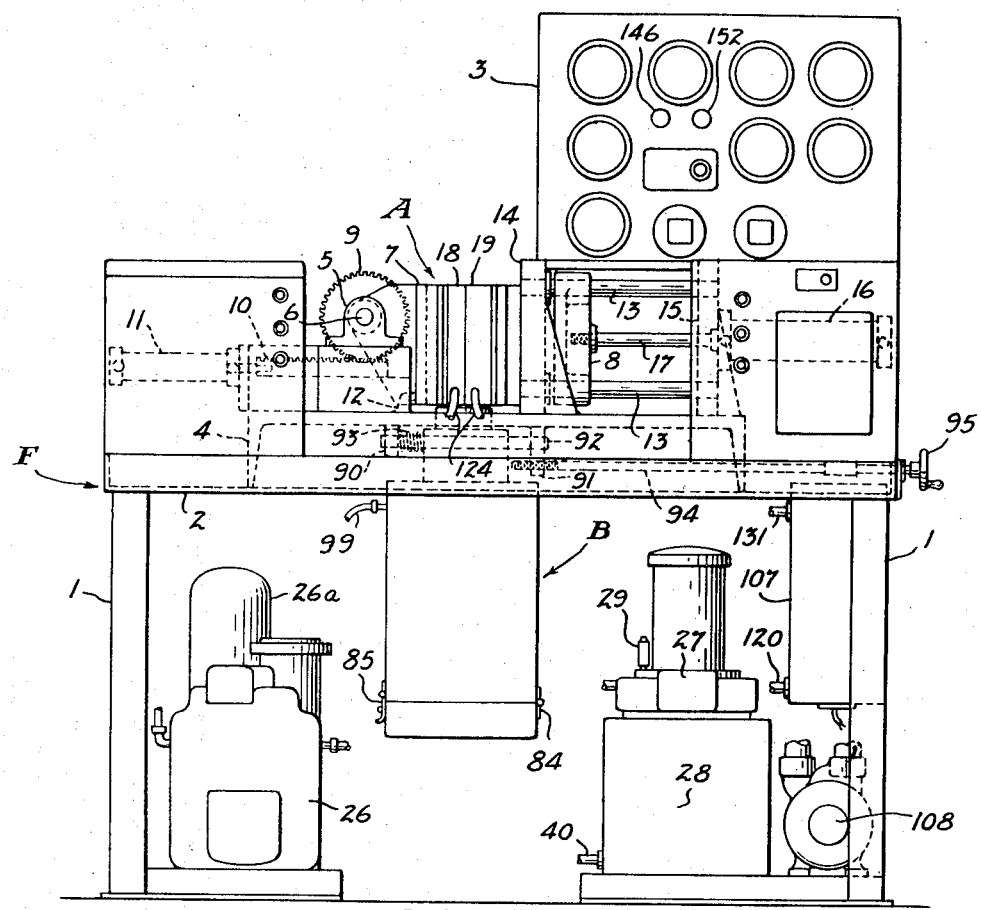
FIGURE 1 is a side elevational view on a reduced scale showing molding apparatus constructed according to the present invention.
Figure 2:
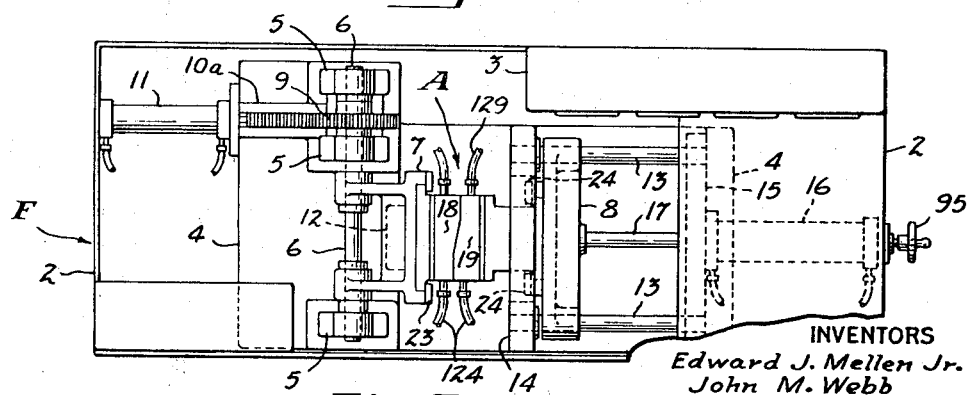
FIGURE 2 is a top plan view of the apparatus of FIGURE 1 on the same scale.

Referring more particularly to the drawings, in which like parts are identified by the same numerals throughout the several views, FIGURES 1 and 2 show a semi-automatic machine for performing the method of this invention having a rigid metal frame F with four vertical legs 1 which support a horizontal platform 2 and a vertical panel 3. A cast iron base 4 is rigidly mounted on the platform 2 of the frame F to provide a support for the die assembly A.

Rigid supports are mounted on the base 4 including three pillow blocks 5 having roller bearings therein for rotatably supporting a horizontal shaft 6. Rigidly mounted on the shaft is a swivel platen 7 and a spur gear 9, whereby the platen is swung when the gear is rotated. A platen 8 is mounted above the base 4 for horizontal sliding movement toward and away from the platen 7. Both platens are hydraulically actuated to effect opening and closing of the mold halves. A rack 10 is mounted for horizontal sliding movement in a guide 10a and has teeth meshing with the teeth of the gear 9 to effect swinging of the platen 7, said rack being connected to the piston of a conventional hydraulic cylinder 11 which is rigidly mounted on the guide member 10a. The movement of the rack 10 toward the cylinder 11 moves the platen 7 from a retracted position, as shown in dot-dash lines in FIGURE 3, to an operating position as shown in solid lines in that figure. A locking member 12 is rigidly mounted on the base 4 and projects upwardly therefrom to engage the bottom portion of the platen 7, as shown in FIGURE 3, to hold said platen in its operating position with the face of the platen in a vertical position whereby the mold halves fit together properly as shown in FIGURES 2 and 4.

The sliding platen 8 has four cylindrical bores therein which receive four horizontal shafts 13 to permit horizontal sliding of the platen. These four shafts are rigidly mounted on front and rear vertical standards 14 and 15 which are rigidly mounted on the base 4, the front support 14 having a relatively large opening 25 therein to permit the die half 19 to move horizontally through said support when the platen 8 is reciprocated. A hydraulic cylinder 16 is rigidly mounted on the standard 15 and has a horizontal piston rod 17 which is connected to the platen 8 to effect movement of the platen when the piston is actuated.

Molds or dies of various types may be mounted on the platens 7 and 8 and used to perform the method of this invention. It is usually preferred to provide molds which may be heated and cooled in a predetermined manner. As herein shown, a mold is provided having left and right die halves 18 and 19. If desired, each die half may be provided with a thin vertical layer 20 of insulating material to minimize heat transfer, but this is not always required. As herein shown, each die half is cored to provide water passages and has inlet connections for receiving heating or cooling fluid, but it will be apparent that other constructions are also suitable. The mold half 18 has fluid passages 21 and the complementary mold half 19 has similar cooling passages 22. The mold sections 18 and 19 are rigidly mounted on the platens 7 and 8, respectively, by die clamps 23 and 24 or other suitable holding means.

The hydraulic system for operating the platens 7 and 8 is shown schematically in FIGURE 10 and includes a motor-driven pump 27 which pumps oil from a reservoir 28 through a pressure regulator 29 and solenoid valves 30 and 31, respectively, to the cylinders 11 and 16, respectively. The valve 29 is a conventional pressure regulating valve which maintains a predetermined constant pressure in the supply lines 36 and 37, the excess fluid being directed through the by-pass line 41 back to the reservoir. Each of the solenoid valves 30 and 31 is a conventional two-way, three-position valve having one position in which the oil is directed to one side of the hydraulic cylinder to advance the piston, another position in which the oil is directed to the opposite end of the hydraulic cylinder to retract the piston, and an intermediate position which cuts off the flow of oil to the hydraulic cylinder. The two hydraulic cylinders are provided with conventional speed-control or throttling valves 32, 33, 34 and 35, which control the speed of movement of the pistons of each cylinder when the cylinder is actuated.

When oil from the supply line 37 is admitted to one end of the hydraulic cylinder 16 to move the piston, the piston forces oil out of the other end of the cylinder through the return line 39 and the inlet 40 to the reservoir, the valve 31 being constructed to permit such return flow whenever oil is admitted under pressure to either end of the cylinder 16. The valve 30 is identical to the valve 31 and permits flow through the return line 38 to the reservoir whenever oil is admitted to either end of the cylinder 11.

It is preferable to provide means for maintaining the oil temperature in the reservoir 28 below a predetermined value. As herein shown, a conventional water-oil heat exchanger 42 is provided in the reservoir. The coil of this heat exchanger receives water from a supply line 43 under the control of a conventional solenoid valve 45 and discharges the water to the drain 44. The cooling water from the line 43 removes the heat compression and friction that the oil absorbs during operation of the machine. The solenoid of the valve 45 may be responsive to the temperature of the oil to shut off the cooling water whenever the oil temperature reaches a predetermined temperature as is well understood in the art.

Electrical means are provided for controlling the operation of the hydraulic system in accordance with the position of the platens 7 and 8. As herein shown, three limit switches 46, 47 and 48, are mounted in fixed positions on the base 4. The movable actuating element of the switch 46 is located to engage the mold half 18 as the platen 7 arrives at its operating position. The movable actuating element of the switch 47 is likewise located to engage a downwardly projecting portion 49 of the platen 8 as said platen arrives at its operating position. The actuating element of the switch 48 engages the portion 49 when the platen 8 reaches its fully retracted position.

A similar limit switch 50 is rigidly mounted on the base 4 to engage the ceramic cell when it arrives at its operating position. The purposes of the above limit switches are explained hereinafter.

A slurry cell assembly B is provided for storing refrigerated ceramic slurry and for injecting such slurry into the closed mold (18–19). This assembly includes a cup-shaped slurry cell 52 in the form of a round stainless steel vessel or tank and a bulkhead assembly 53 which closes the upper end of the slurry cell and supports the cell from the base 4 in a position below the mold as shown in FIGURE 3. The bulkhead assembly includes a generally cylindrical metal portion 54 having a vertical axis, a horizontal rectangular cover portion 55 which forms the top of the insulated box 80, and an annular insulating layer 88 surrounding portion 54.

A long central vertical tube 56 of circular cross section is mounted in the center of the cell 52 concentric thereto and is surrounded by a thin cylindrical inner jacket 57 of stainless steel having top and bottom annular closure members 58 and 59 which seal the annular space 60 between the tube 56 and the jacket 57 to provide a refrigerant chamber. A stainless steel nozzle 61 having a horizontal flange 62 is rigidly mounted on the top of the bulkhead assembly 53 coaxial with the tube 56 by means of bolts 70 which are screwed into the annular member 58. The flange 62 has an externally cylindrical surface of the same radius as the semi-cylindrical surfaces 63 of the molds 18 and 19 and is adapted to fit between the molds as shown in FIGURE 8 when the mold 8 is in a fully closed position.

The nozzle 61 projects above and below the flange 62, the downwardly projecting portion being externally cylindrical and having a frusto-conical internal surface 65. The remaining portion of the nozzle has a cylindrical internal surface 66 coaxial with the tube 56. The annular upwardly projecting portion of the nozzle has an O-ring formed of rubber or other elastomeric material mounted in an annular groove, the annular portion 68 of the nozzle below the groove having a radius slightly less than that of the semi-cylindrical internal surfaces of the insulating members 71, and the annular end portion 69 having a slightly smaller radius. Thus, when the mold is fully closed, annular clearance spaces are provided between the metal nozzle and the insulating members 71 to minimize heat transfer from the heated die halves to the nozzle. The O-ring 67 holds the nozzle out of contact with the die halves to maintain said clearance spaces while providing a tight seal between the nozzle and the mold surfaces at 71 to prevent leakage of ceramic slurry when the slurry is forced into the mold under pressure.

The bottom portions of the mold halves 18 and 19 are provided with semi-circular insulating members 71 of rectangular radial cross section which provide a cylindrical opening to receive the nozzle when the mold is fully closed. The mold halves fit together to provide a cylindrical internal surface at 71 and inlet surfaces 72 which define a passage of circular cross section coaxial with the tube 56 leading to the mold cavity 73 when the mold is fully closed as shown in FIGURES 3 and 4. As herein shown, the mold cavity is shaped to form a conventional turbine blade core, but it will be understood that various other articles may be molded using the machine shown herein.

The bulkhead assembly 53 may be provided with a thin metal shell 74 of rectangular horizontal cross section to hold the peripheral insulation 75 which surrounds the cylindrical portion 54. This insulation is employed to minimize heat flow toward the refrigerant chamber 60 and to minimize condensation on the exterior surfaces of the bulkhead assembly.

An annular outer jacket is rigidly mounted on the cover portion 55 concentric to the vessel 52 and has thin stainless steel inner and outer walls 76 which define an annular refrigerant chamber 78 similar to the chamber 60. The bottom of the chamber is closed by an annular closure member 69 which is rigidly connected to the walls 76 and 77. It will be noted that both the inner and outer jackets for the refrigerant are rigidly connected to and supported by the bulkhead assembly but that the cell 52 is removable from the cover 55. In order to support the vessel 52, a retainer ring 87 having an internal diameter slightly less than that of the vessel is bolted to the closure member 79, said closure member being welded to or otherwise being rigidly connected to and supported by the outer jacket. The ring 87 engages an annular shoulder on the vessel 52 so as to hold the flat circular upper edge of the vessel against the elastic rubber sealing ring 51 which is located in an annular groove in the flat bottom surface of the portion 55 as indicated in FIGURE 3. Thus, the vessel is clamped tightly against the sealing ring to prevent escape of nitrogen gas from the vessel when high pressure is applied to inject the slurry into the mold.

The insulated box 80 surrounds the outer jacket and slurry cell to minimize flow of heat toward the ceramic slurry stored in the cell. As herein shown, this box is externally rectangular and internally cylindrical, but it will be manifest that other shapes are also suitable. The box has a thin outer metal shell 81 having flat vertical walls and a flat bottom wall, which is swingable relative to the vertical walls by means of the hinge 84. Peripheral insulation 82 fills the space between the vertical walls and the outer jacket, and the flat bottom insulating layer 83 fills the space between the cell 52 and the bottom of the box. The outer shell 81 is welded or otherwise rigidly connected to the rectangular portion 55, whereby the box is supported by the bulkhead assembly 53.

The box is reinforced adjacent the bottom of the slurry cell by two externally rectangular rings 86 and 86a, which are rigidly attached to the two halves of the hinge 84. The ring 86a thus reinforces the access door below the ring 86, and the ring 86 reinforces the box while engaging the outer jacket wall 77 throughout its periphery to position the box and the jacket relative to each other. The access door is held in a closed position, as shown in FIGURE 3, by the latch 85, which may be released to open the door and to permit removal of the ring 87 and the slurry cell 52 when it is desired to clean the cell.

A bulb well 102 is mounted on the bottom of the cell 52 to provide a receptacle for the thermostatic sensing element 103.

Various conventional refrigeration systems are suitable for use in maintaining a predetermined low temperature in the slurry cell 52. As shown in FIGURE 1, a compressor 26 and a condenser 26a of a conventional refrigeration system are mounted on the floor adjacent the frame F. Suitable controls (not shown) may be provided, which are responsive to the thermostatic sensing element 103, to maintain a predetermined low temperature (i.e., −50° F.) in the slurry cell as is well understood in the refrigeration art. The refrigerant is preferably a liquefied gas having a low boiling point, such as difluorodichloromethane, monochlorodifluoromethane or the like.

The refrigerant is fed through the inner and outer jackets of the slurry cell assembly B to maintain a predetermined low temperature in the slurry cell 52, which may be as low as −75° F. The refrigerant flows through the supply line 96 to a vertical dip tube 97 which extends from a point near the top of the refrigerant chamber 60 to a point near the bottom of said chamber. The refrigerant then flows from the bottom of said chamber to the flexible connecting line 98 which communicates with the upper end of the chamber, said connecting line being connected to a second dip tube 101 which carries the refrigerant from the top to the bottom of the refrigerant chamber 78. The refrigerant then flows from the bottom of the latter chamber to the flexible outlet line 99 which communicates with the top of said chamber as shown in FIGURE 3. As herein shown, the inner and outer refrigerant chambers 60 and 78 are connected in series, but it will be understood that other arrangements are also suitable provided that the refrigerant entering the bottom of the inner chamber 60 has the desired low temperature.

The refrigerant chamber 60 functions to cool the entire tube 56 including the ceramic slurry at the top of the tube 56. This prevents the slurry from setting up at the top of the tube 56 at the end of the mold heating period and during the period prior to the next injection. If desired, the tube 56 may be provided with external ribs or fins to increase the rate of heat transfer.

The refrigerated ceramic slurry in the cell 52 is forced upwardly through the tube 56 into the mold cavity by the pressure of the dry gas, such as nitrogen, which is fed into the top of the slurry cell through the gas supply line 100. Since the tube 56 is not provided with a control valve in the apparatus shown, the flow from the gas pressure source is controlled by a conventional solenoid valve 105 located in the line 100 as shown schematically in FIGURE 3. The valve 105 may be omitted when a solenoid valve is provided in the tube 56 to open and close the tube.

The machine shown in the drawings is constructed to have substantial versatility. In order to permit the use of molds or dies of different sizes, it is preferable to adjust the relative positions of the slurry cell and the platens 7 and 8. It is preferable to adjust the slurry cell in a horizontal direction toward and away from the shaft 6. As herein shown, the assembly B is mounted on horizontal shafts below the base 4 for movement in a direction parallel to the horizontal shaft 17. The carriage 89 is mounted on two horizontal shafts 92 which are rigidly supported with their axes in the same horizontal plane by two vertical lugs 90 and 91, as best shown in FIGURES 3 and 6. This figure views the top of the bulkhead assembly, the lugs 90 and 91 being shown in horizontal section and the parts above the bulkhead assembly being omitted.

A spring 93 is mounted on each shaft 92 between the lug 90 and the shell 74 to bias the bulkhead assembly in a direction toward the lug 91. The movement in this direction is limited by a long horizontal adjusting rod 94, which is supported by the lug 91 and the frame F for rotation about a horizontal axis. The rod has threads at one end, which screws into the lug 91, and has a handle 95 at the opposite end which may be turned manually to adjust the position of the end of the rod which engages the shell 74. It is thus possible to adjust the operating position of the nozzle 61 so that it will fit molds (or dies) of different sizes without changing the position of the shaft 6.

Since the assembly B is free to move horizontally when engaged by either of the die halves 18 and 19, the nozzle does not interfere with closing of the mold (18–19) even when the position of the assembly B is not accurately adjusted by the handle 95. It is thus very easy to make the adjustments necessary to permit changing from one size mold to another. The lines 96, 98, 99 and 100 are flexible so as not to interfere with the horizontal movement of the slurry cell assembly. It will be noted that the inlet line at 96 which extends through the insulation 75 is parallel to the shafts 92 and is free to move through the lug 90 without interfering with horizontal movement of the carriage 89.

The springs 93 normally hold the bulkhead assembly against the end of the rod 94 so that the nozzle 61 is out of contact with the mold half 18 and cannot interfere with swinging movement of the platen 7. When the platen 7 is swung from the retracted position, shown in dot-dash lines in FIGURE 3 wherein the parting face of the mold half 18 is in a horizontal position, to the operating position shown in solid lines in FIGURE 3, wherein the platen is supported by the lock 12 and the nozzle 61 is spaced a short distance (for example, less than one inch) from the semi-cylindrical surfaces 63 and 71 of the mold half 18 as shown in FIGURE 8.

The closing movement of the platen 8 is timed so that the final closing movement of the die half 19 occurs after the die half 18 has reached its vertical operating position. During this final closing movement, the semi-cylindrical surface 63 of the die half 19 engages the flange 62 as shown in FIGURE 8 and carries the nozzle 61 and the bulkhead assembly 53 from the position shown in solid lines in FIGURE 8 to the position shown in dot-dash lines in that figure. When the mold halves are closed, as shown in FIGURES 3 and 4, the surfaces 63 and 71 engage the nozzle and the O-ring 67 throughout the periphery of the nozzle.

When the ceramic material has been injected and has set, the mold is opened by first retracting the platen 8, the springs 93 causing the nozzle 61 to move away from the mold half 18 just before the platen 7 is retracted, whereby there is no frictional contact between the nozzle and the mold during swinging of the platen which could interfere with such swinging or cause excessive wear.

When molding certain parts, such as long rods having very small diameter (for example, a diameter of 0.05 inch) or parts having complicated shapes, fine detail, thin sections and the like, it is often necessary to prevent the ceramic slurry from setting up too quickly, and it is desirable to provide a mold which is cored to provide passages for flow of heating or cooling fluid, such as water or steam. FIGURE 9 shows schematically a suitable heating and cooling system which may be employed with the machine of FIGURES 1 to 8. This includes an insulated water heater 107 and a motor-driven water pump 108 which may be located on the frame F as shown in FIGURE 1. The system also includes a water filter 109, a pump-pressure relief valve or by-pass valve 110, a heating solenoid valve 111, a cooling solenoid valve 112, check valves 113, 114 and 115, and regulating valves 116 and 117. These valves are all of the conventional type and need not be described in detail. The supply of hot and cold water is controlled primarily by the valves 111 and 112, which are moved by their solenoids to an open or closed position.

Cold tap water, chilled water or other cooling liquid is supplied from a supply line 118. When the valve 111 is closed and the valve 112 is opened to permit flow of tap water through the mold halves 18 and 19, the water from the line 118 flows through the pressure regulating valve 117 which maintains a low pressure on the downstream side of the valve. The water then flows through the check valve 113 to the inlet header 123 which is connected by flexible hoses 124 to the inlets 125 and 126 of the mold. The water flows through the cooling passages 22 and 23 of the mold halves to the outlets 127 and 128, respectively, and through the flexible hoses 129 to the outlet header 130. Since the valve 112 is open at this time, the water flows out of the system through the drain line 132.

When it is desired to switch from cooling to heating, the automatic electrical controls causes the valve 112 to close and the valve 111 to open, while at the same time starting the motor 150 driving the pump 108. The tap water from the supply line 118 then flows through the make-up line 119 through the valve 111 and the one-way check valve 115 to the pressure regulating valve 116, which restricts the flow and maintains a low pressure at the down stream side of the valve. The amount of water flowing into the water heater 107 is thus no more than that required to maintain the hot water level. The pump 108 draws the hot water through the hot-water supply line 120 and the filter 109 and pumps it through the supply line 121, the conventional throttling valve 106, and the one-way check valve 114 to the inlet header 123. The water then flows from the inlet header through the mold to the outlet header 130 and through the hot water return line 131 to the heater 107, the flow to the drain being prevented by the closed valve 12.

An expansion tank 133 is provided to prevent excessive hydrostatic pressure when the water is heated, and suitable vent or relief valves are also provided for safety purposes.

The pressure relief valve 110 by-passes water through the by-pass line 122 to prevent any damage to the system by excessive pump pressures.

Means may be provided to maintain any desired hot water temperature. It is usually preferable to maintain the hot water at a temperature of 200 to 250° F., but it will be understood that steam heating may also be employed in the practice of this invention. As herein shown, a water thermostat 135 is provided which controls the heating element 134 of the heater to maintain a predetermined water temperature. Thermoswitches 136 and 137 are provided in the mold halves 18 and 19, respectively. These are part of the electrical system which is described hereinafter.

The method of this invention permits mass production of turbine blade cores, U-shaped rods, long rods of small diameter and various other articles which heretofore could not be made satisfactorily. It is possible to make a simple turbine blade core and also more complicated cores having very thin sections. FIGURE 7 shows such a core $b$ having a thin trailing edge portion 203 and a relatively thick leading portion 200 with a straight leading surface of the usual curved cross section. The trailing portion has straight sides 203 spaced inwardly from the ends of the core $b$ and a series of parallel slots 201 which form metal reinforcing ribs in the finished turbine blade. The trailing edge of the core is thus divided into spaced portions 202. The slots 201 may be sawed or otherwise formed. The core $b$ must be of the highest possible quality so that the thin portions will not break and so that the necessary dimensional accuracy is maintained. Articles of this type are easily mass produced employing the process of this invention.

The process of the present invention can be performed manually at a high rate of speed to effect economical mass production of ceramic cores or ceramic mold halves, but cores can be made faster with a lower percentage of defective pieces using semi-automatic equipment. The apparatus shown in FIGURES 1 to 10 for example, may be controlled manually by an operator watching the gages on the panel 3, but it is preferable to provide electrical controls to cause automatic or semi-automatic operation of such apparatus.

Figure 11:
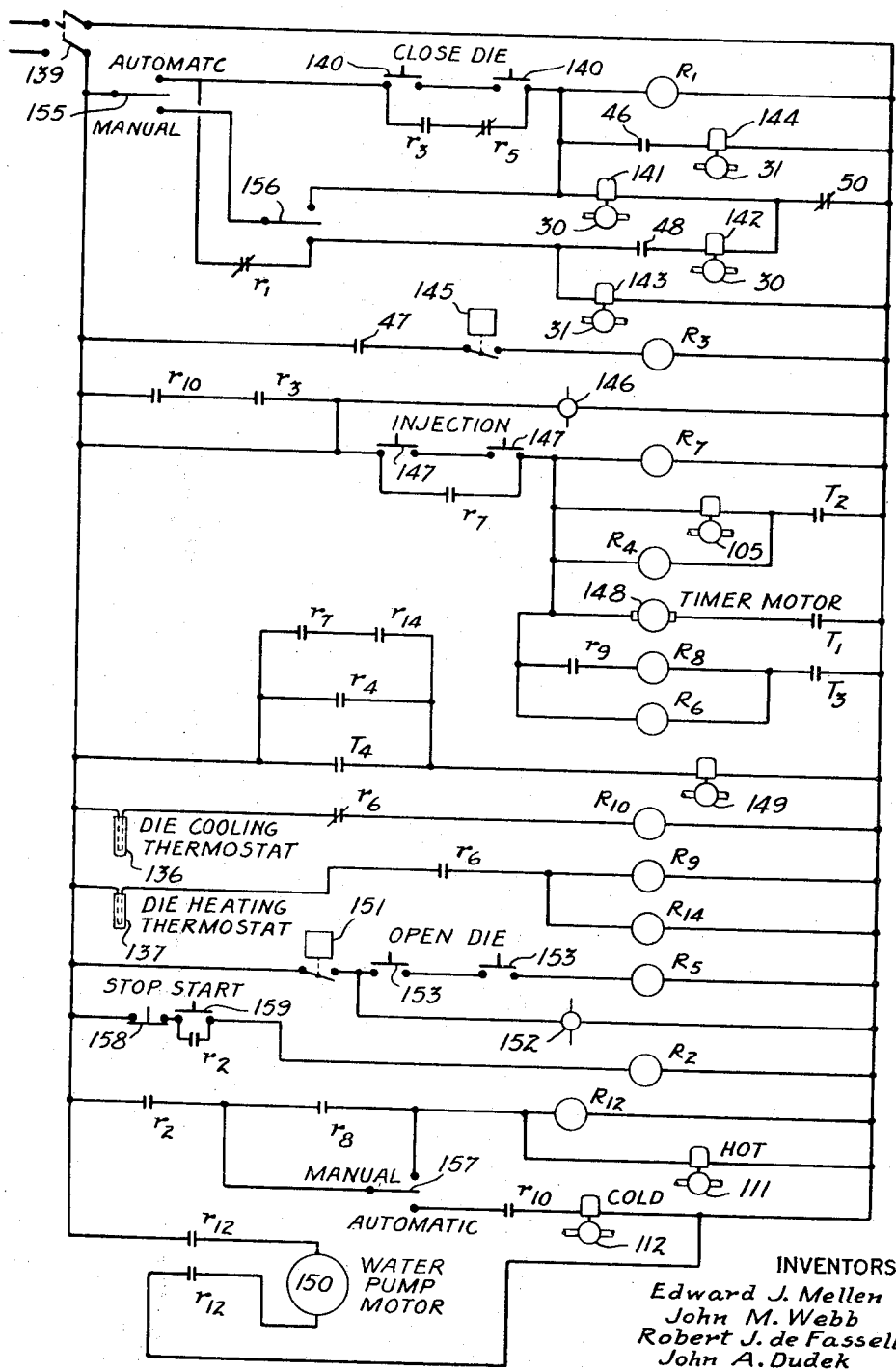
FIGURE 11 is an electrical diagram showing the electrical equipment used with the apparatus of FIGURES 1 to 6 and 8 to 10.

FIGURE 11 is a diagrammatic view of suitable electrical control equipment, it being understood that additional conventional electrical devices may also be employed for other purposes which are not necessary for an understanding of the invention. When it is desired to start production of ceramic cores or other ceramic mold parts, the switch 139 is closed, the motor (not shown) driving the hydraulic pump 27 is started, and the solenoid valve 45 is opened to allow cooling tap water to flow through the heat exchanger 42. At this time the hot water heating element 134 is in operation, the refrigerant compressor 26 is in operation, the refrigerant is fed through the inner and outer jackets of the ceramic cell, the thermostat 103 is set to maintain the slurry at a predetermined low temperature (which is usually —40° F. to —50° F.), and the hot water thermostat 135 is set to maintain a predetermined water temperature which is preferably 200° to 250° F. The thermostat may, however, be set to maintain such temperature at 80° to 200° F. A fixed water temperature is desirable to provide the mold with a predetermined temperature, whereby uniform results are obtained.

With the electrical equipment shown herein, the operation is semi-automatic in that the operator has to actuate push buttons (140, 147 and 153) for three basic operations which then are automatically executed. These operations are (a) closing the die or mold (b) injecting the slurry into the die cavity, and (c) opening the die. It will be manifest, however, that these steps may all be performed automatically. After the die is opened, however, the operator is usually needed to inspect the finished pattern or core and to remove the core from the die half 18.

The electrical equipment of FIGURE 11 is set for semi-automatic operation by placing the switch 155 in its uppermost position and placing the switch 157 in its lowermost position. When the switch 155 is in its lowermost (manual) position, the switches 155, 156, 158 and 159 may be used for manual control of the equipment.

Operation is initiated by depressing the start button 159 and the two horizontally spaced push buttons 140 after the switch 155 has been moved to the upper "automatic" position. This is a safety measure to make sure that both hands are on the buttons 140 until the die is closed. As soon as the relay $R_1$ is energized, it opens the normally-closed switch $r_1$ in the line supplying the solenoids for the valves 142 and 143 so as to lock out these solenoids. The current passing through the two buttons 140 energizes the solenoid 141 of the valve 30 to admit hydraulic fluid to the piston end of the cylinder 11, thereby swinging the platen 7 clockwise to its operating position. As the mold half 18 moves against the stop 12 to its vertical operating position, it trips and closes the limit switch 46 to energize the solenoid 144 of the hydraulic valve 31, thereby admitting fluid under pressure to the right end of the cylinder 16 and initiating closing movement of the platen 8. The die half 19 engages the nozzle 61 as shown in FIGURE 8 and moves the carriage 89 and the slurry cell 52 one-half inch or so during the final closing movement.

If the die half 19 is not properly seated the normally-open limit switch 47 prevents subsequent energization of the relay $R_3$. When the die is properly closed the actuator 49 trips the switch 47 and closes it.

Since the hydraulic fluid continues to be pumped to the cylinder 16 after movement of the platen 8 has stopped, there is an increase in hydraulic pressure. A normally-open switch 145 responsive to this pressure is closed when the pressure reaches a predetermined amount to energize the relay $R_3$, thereby closing the normally-open switches $r_3$. Current is then supplied to the relay $R_1$ through the switches $r_3$ and $r_5$ so that the operator may release the two buttons 140.

Since the normally-closed switch $r_6$ energizes the relay $R_{10}$ at this time, the closed (normally-open) switches $r_3$ and $r_{10}$ supply current to the ready light 146 upon energization of the relay $R_3$, thereby signalling that the equipment is ready for injection. In response to this signal, the injection may be started automatically but it is preferably started manually. The operator uses both hands to close the two push buttons 147 and to energize the relay $R_7$ which immediately closes the normally-open switch $r_7$. This completes the circuit through the switch $r_7$ and the relay $R_7$ so that the operator need not continue to hold the buttons 147.

The closing of the switch $r_7$ energizes the timer motor 148 for the timers $T_1$, $T_2$, $T_3$ and $T_4$. The timer motor is held in by the timer contact $T_1$ which is closed almost immediately. The timer $T_2$ also closes almost immediately to energize the solenoid of the gas-pressure valve 105 and thereby admit pressurized dry gas through the line 100 to the top of the slurry cell 52. The gas pressure, which may be more than 100 pounds per square inch gage, forces the refrigerated ceramic slurry up through the nozzle 61 into the die cavity 73 to fill the cavity rapidly.

The die temperature and time for filling the die will vary according to the type of article being molded. The timer $T_2$ is set to open after a predetermined time (when the die is filled) to deenergize the solenoid of the valve 105 thereby effecting closing of the valve and discontinuing feed of the ceramic slurry. It will be noted that timer $T_2$ energizes relay $R_4$ to close normally-open switch $r_4$ and to energize the solenoid of the vent valve 149 whereby said valve is closed and cannot vent the slurry cell 52.

The start button 159 is preferably pushed at the beginning of a cycle but this is not essential. It must be pushed, however, to effect starting of the water pump motor 150 or to obtain automatic heating and cooling of the die. When the button 159 is closed to energize the relay $R_2$ the normally-open switch $r_2$ of the holding circuit immediately closes to bypass said button so that said relay remains energized when the button is released. Closing of the normally-open switch $r_2$ in series with the switch $r_8$ closes line leading to the relay $R_{12}$ so that the pump motor 150 may be started manually or automatically depending in the position of the switch 157.

When the timer $T_2$ opens to stop the injection of slurry, the timer $T_3$ immediately closes to energize the relay $R_6$ and to close the normally-open switches $r_6$. This energizes the relays $R_9$ and $R_{14}$ to open or close the switches $r_9$ and $r_{14}$. The normally closed switch $r_6$ is opened to deenergize the relay $R_{10}$ and to return the switches $r_{10}$ to their normal positions, whereby the ready light 146 goes out and the solenoid of the cold water valve 112 is deenergized to cut off flow of cold water through said valve. Since $r_9$ and $T_3$ are both closed, the relay $R_8$ is energized to close the normally-open switch $r_8$, thereby energizing the relay $R_{12}$ and the solenoid of the hot water valve 111. This initiates flow of hot water through said valve 111 and closes the normally-open switches $r_{12}$ to start the motor 150 which drives the water pump 108.

Thus, the hot water is fed to the fluid passages 22 and 23 of the die halves a predetermined period of time after the injection of the slurry is initiated and preferably after the die cavity is filled with ceramic slurry. This speeds up the setting of the ceramic material.

It is preferable to cut off the flow of heating fluid after the die is heated to a fixed temperature. This is accomplished by the heating thermostat 137 which opens at a predetermined temperature to deenergize the relays $R_9$ and $R_{14}$ to return the switches $r_9$ and $r_{14}$ to their normal open positions, to deenergize the relay $R_8$, and to return the switch $r_8$ to its open position, thereby shutting off the pump motor 150 and the hot water valve 111.

Before the die can be opened, it is necessary to reduce the gas pressure in the slurry cell 52, for example, by venting to atmospheric pressure. This venting is carried out when the vent valve 149 is opened by deenergizing its solenoid. It will be noted that the switches $r_4$ and $r_{14}$ and the timer $T_4$ are connected in parallel so that all three must be open to deenergize the solenoid of the vent valve. The normally-open switch $r_4$ is open when relay $R_4$ is deenergized by timer $T_2$ at the end of the slurry injection, and the switch $r_{14}$ is open when the relay $R_{14}$ is deenergized by thermostat 137. The timer $T_4$ is thus the last to open and provides means for controlling the "setting time" for the heated ceramic material in the mold cavity. After a predetermined setting time the timer $T_4$ open to deenergize the solenoid of valve 149 and to effect venting of the slurry cell 52. As soon as the pressure has been reduced the operator presses the two push buttons 153 to energize the relay $R_5$ and to initiate opening of the die.

It is preferable to provide means to warn the operator or delay the energizing of the relay $R_5$ in the event the pressure has not been reduced sufficiently in the slurry cell. As herein shown, a normally-open pressure switch 151 is connected in series with a ready light 152 and closes when the gas pressure in the slurry cell 52 falls below a predetermined safe amount. This energizes said light and signals the operator that the mold (18–19) is ready to be opened. In response to this signal the operator pushes both push buttons 153 to energize the relay $R_5$, thereby opening the normally-closed switch $r_5$ to deenergize the relay $R_1$ and the solenoid 141. The normally-closed switch $r_1$ in series with the solenoid 143 then effects operation of the hydraulic valve 31 to supply fluid under pressure to the left end of the cylinder 16, thereby retracting the platen 8. When the die is open and the platen 8 is fully retracted, the member 49 trips and closes the limit switch 48 to energize the solenoid 142 of the hydraulic valve 30 and thereby initiate opening movement of the swivel platen 7 by the cylinder 11.

The safety switch 50 is closed at this time since the springs 93 have moved the slurry cell carriage 89 to the retracted position shown in solid lines in FIGURE 8 where the nozzle 61 cannot interfere with swinging movement of the die half 18. The switch 50 is opened when the slurry cell is in its operating position and the mold is closed and remains in the open position until the mold is opened and the nozzle 61 is out of the path of movement of the swinging die 18.

During the final opening movement, the platen 7 swings the mold half 18 to the uppermost horizontal position shown in FIGURE 10. The finished core or pattern has less tendency to stick to the die half 19 and remains on the die half 18. The unit is ready for another cycle of operation as soon as the finished core is removed, and this cycle is initiated by pushing the buttons 140 as before.

It is usually necessary to have an operator remove the finished patterns from the machine, but it will be apparent that fully automatic operation is possible. The ready lights 146 and 152, for example, could be replaced with relays and associated switches to initiate automatic closing of the switches 147 and 153, respectively.

If manual operation is desired the switch 155 is moved to its lower "manual" position, tnd the hydraulic valves 30 and 31 are controlled manually by the switch 156.

In performing the process of this invention, a ceramic slurry may be employed comprising finely divided refractory particles, a binder, a liquid vehicle, and an accelerator. The binder or hardener which bonds the refractory particles together may be colloidal silica or other conventional binder as disclosed in U.S. Patent No. 2,932,864 but it is preferably ethyl silicate which deposits silica upon drying from an alcoholic solution. The ingredients employed in the slurry may be conventional.

The setting of a ceramic slurry in a mold may be accelerated by controlling the pH. The accelerators increase or decrease the pH to harden the ceramic material more rapidly. In an ethyl silicate system, for example, a mixture of water and ammonium acetate provides an effective accelerator. In other systems an acidic material such as hydrochloric acid, rather than an alkaline material, might be used as an accelerator, but systems requiring an alkaline accelerator are most common.

Ethyl silicate is one of the most commonly used binders, and the manner of using this material in ceramic slurries is well understood in the investment casting art as disclosed for example in U.S. Patent No. 2,818,619 and U.S. Patent No. 2,948,935. As pointed out in the above patents, the ceramic slurry comprises a dry mix to which the ethyl silicate binder is added, said dry mix consisting essentially of finely divided refractory material, such as fused silica or zirconium silicate, and a very small proportion of an accelerator or gelation agent for the binder such as an alkaline oxide or carbonate. Magnesium oxide is the setting catalyst preferably employed.

The ethyl silicate type of binder used in the process of this invention usually comprises, by weight, about 30 to 60 percent ethyl silicate, about 30 to 60 percent alcohol, about 0.05 to 0.5 percent concentrated hydrochloric acid, and about 1 to 10 percent water. One part by weight of such binder is preferably mixed with about 2.5 to 4.5 parts by weight of the dry refractory material or dry mix. When the above investment dry mix and the binder are mixed the resultant ceramic slurry may, for example, comprise about 50 to 90 percent of finely divided refractory material (which may include 20 or 25 percent silica flour), about 0.05 to 1.5 percent magnesium oxide, about 5 to 20 percent condensed ethyl silicate, about 5 to 20 percent alcohol, about 0.01 to 0.1 percent hydrochloric acid, and about 0.5 to 4 percent water. It will be understood, however, that the proportions of ingredients may vary considerably.

In the practice of this invention various hydrolyzed solutions of ethyl silicate may be employed as disclosed, for example, in the publication "Some Observations on Investment Casting Processes with Ethyl Silicate Binder Solutions" printed in December 1957, by Union Carbide & Chemical Company.

The ethyl silicate type of binder may employ catalysts such as magnesium oxide, aluminum oxide. The ceramic slurry used in the process of this invention may also contain high temperature binders such as magnesium fluoride, boric acid, aluminum oxide, phosphate groups or the like. Various chemicals or combinations of chemicals may be employed to cause a neutral or slightly alkaline reaction to accelerate the gelling of the mix. Suitable accelerators of this type include ammonium hydroxide, ammonium carbonate, ammonium acetate, morpholine and the like. The rate of gel can be varied by varying the amount of the accelerator.

Various refractories may be employed in the ceramic slurry including most of the refractory oxides such as aluminum oxide and oxides of zirconium, magnesium, beryllium or titanium. Zirconium or aluminum silicates may also be used. An excellent choice is a mixture of 60 percent fused silica and 40 percent zirconium silicate (zirconite). The refractories preferably have sufficient fineness so that at least 60 percent will pass through a standard 100-mesh screen. A substantial amount of the refractory may be in the form of a flour which will pass through a 200-mesh screen.

The ceramic slurry may contain various refractory materials or refractory binders, including organic binders such as polyvinyl butyrate, that give better green strength and sintering strength as is well understood in the art.

It will be understood that the ceramic slurry used in the practice of this invention should be compounded in accordance with the shape, size and other desired characteristics of the core or other pattern being made in the mold. Thus, the particle size of the refractory, the type of refractory, the type of binder, the type of accelerator, and the amount of accelerator may vary considerably in the ceramic slurry, and the temperatures, pressures and molding times will also vary depending on the type of pattern being made.

When making patterns, such as turbine-blade cores, which are to be used in forming metal parts it is necessary in the practice of this invention to employ a high temperature binder which is effective in binding the refractory particles together at very high temperatures ranging from about 300° C. to about 1300° C., and which holds the particles together up to the temperature (i.e., 1650° C., or higher) at which the molten metal is cast in the mold. Such high temperature binders are conventional and form no part of this invention.

A typical example of the process is given below to facilitate an understanding of the invention.

To provide a carrier which is liquid at low temperature, 5300 milliliters of ethyl silicate grade 40 are mixed with 4200 milliliters of ethyl alcohol and 500 milliliters of one percent hydrochloric acid. One part by weight of the resulting liquid carrier is then added to a large mixing machine together with three parts by weight of a conventional dry mix consisting of 60 percent by weight of fused silica, 39.5 percent zirconium silicate, and 0.5 percent magnesium oxide, which has previously been prepared in a ball mill. The zirconium silicate is in the form of a powder which will pass through a 200-mesh (U.S. Standard Sieve) screen. The fused silica comprises 40 percent by weight of coarse particles with a 60-mesh to 100-mesh particle size and 60 percent by weight of finer particles with a 100-mesh to 300-mesh particle size.

In order to provide an accelerator for the ceramic slurry, 10 milliliters of a 25 percent solution of ammonium acetate in water are added per 1000 milliliters of said liquid carrier in said mixing machine.

After the carrier, the refractory material, and said accelerator have been thoroughly mixed for several minutes at a temperature of −40° to −30° F. to provide a conventional ceramic slurry, the slurry is placed in the ceramic cell 52 of the apparatus shown in FIGURES 1 to 6. The temperature of the slurry in the cell is maintained at −50° F. during operation of the molding machine and is reduced to −60° F. when the machine is shut down to permit storing of the slurry.

As soon as a sufficient amount of slurry has been mixed and placed in the ceramic cell 52, several ceramic cores are made by the same procedure as described below. In each cycle of operations the buttons 140 are pressed to move the die halves 18 and 19 together and close the die. When the ready light 146 goes on, the buttons 147 are pushed to admit the nitrogen gas to the slurry cell at a pressure of about 250 pounds per square inch gage, the dies being held closed against this pressure when the slurry fills the die cavity. Two seconds after the valve 105 is opened to admit the high pressure to the slurry, the mold (18–19), which is then at a temperature of 60° F., is supplied with hot water from the water heater 107, whose temperature is maintained at 250° F. to heat the mold rapidly to a temperature of 130° F. When the temperature reaches the latter amount, the supply of hot water is discontinued. About one minute after the slurry is injected into the mold cavity and after it has set to the rigid state, the pressure in the ceramic cell is reduced to atmospheric pressure and the buttons 153 are pushed to open the die. Since the die cavity of the mold half 19 is lubricated with graphite, the finished turbine-blade core sticks to the mold half 18 and is carried to a horizontal position when the platen 7 is retracted.

Ceramic cores made in this manner are free of cracks and surface defects, have excellent surface finish, excellent detail, sharp corners, and excellent strength and dimensional accuracy. The process minimizes the amount of scrap due to defective or broken patterns, speeds up production materially, and makes it possible to hold exceptionally close tolerances. The ceramic cores can usually be made at a rate of 12 to 15 or more per hour per operator which is several times the rate of production prior to this invention. The molds do not have to be cleaned as frequently when employing the process of this invention.

In the above example, the ratio, by weight of said dry mix and said liquid carrier may vary from 2.5:1 to 4.0:1 depending on the type of core being made. The accelerator (25 percent ammonium acetate in water) can vary from 1 to 30 milliliters per 1000 milliliters of the liquid carrier (hydrolyzed ethyl silicate), and the water can vary from 2 to 20 milliliters per 1000 milliliters of said carrier.

Various means may be employed to cause the core or pattern to stick only to the die half 18 when the die is opened. It is preferable to accomplish this by lubricating the die cavity of the mold half 19 with a suitable soap, graphite or silicone lubricant, but other methods may also be employed.

The process of the present invention is preferably performed using a ceramic slurry containing a major portion of finely divided refractory particles, a minor portion of an ethyl silicate binder solution, and a setting accelerator for the ethyl silicate, which slurry will set or harden in 5 seconds to 5 minutes at 35° C.

An insulated slurry cell, such as the cell 52, is preferably provided to store the slurry and to supply the slurry to the mold cavity. The process also employs a vertical tube, such as the tube 56, in the cell and a dry gas in the top of the cell to force the ceramic slurry up the tube into a mold cavity above the cell.

A nitrogen gas pressure up to 1,200 pounds per square inch or even higher (i.e., 2000 p.s.i.) may be employed to effect rapid feeding of the slurry, but the pressure is preferably about 50 to 600 pounds per square inch or sufficient to fill the mold cavity in 1 to 5 seconds. The amount of pressure required and the maximum time for filling the mold cavity will depend on the size and shape of the core. In general, cores having thin sections require more pressure and a higher feed rate than thick cores. Likewise, faster injection rates are necessary when large amounts of accelerator are employed to minimize the setting time.

If means are provided for rapidly heating the mold cavity, it is usually preferable to maintain the temperature of the mold cavity between 0° C. and 40° C. immediately prior to injection of the ceramic slurry and to heat the cavity to a temperature of 40° C. to 150° C. after the injection is initiated. The time required to fill the mold cavity is usually about ½ to 3 seconds, and the heating of the mold is preferably initiated 1 to 3 seconds after the injection is initiated.

The mold is held tightly closed from the time the injection is initiated until the ceramic material has set, and the pressure applied by the inert gas to the slurry in the mold cavity is preferably maintained ½ to 3 minutes until the ceramic material sets and becomes firm. After the pattern has become sufficiently firm, the pressure is released and the mold is opened. Further heat may be used for further cure if necessary. The time from the initiation of injection to the opening of the mold is usually 1 to 4 minutes but may be much less.

After the horizontal platen 8 has been retracted to separate the die half 19 from the finished core or pattern and the swivel platen 7 has retracted the die half 18 to its uppermost horizontal position, the pattern in the die cavity may be inspected before being removed.

Heretofore it has been difficult to form cores such as the core b having very thin cross section and a large number of defective cores have been made and rejected as scrap. Cracking was a particularly serious problem and it was difficult to provide good surface characteristics and also adequate strength. The process of this invention solves this problem and makes it easy to mass produce cores having high density and thin cross section.

The feeding of ceramic material into molds to form ceramic cores for investment molding of turbine blades and other metal parts has heretofore been difficult because of the tendency of the ceramic material to harden and clog up the passages feeding the material into the die. To avoid such clogging, it has been necessary to limit the temperature of the mold and the amount of accelerator in the ceramic slurry so that a substantial period of time is required for the material to set up in the mold. The process of the present invention is unusual since the refrigerated ceramic material is injected into a heated die, such heating tending to cause the ceramic material at the inlet to the die to harden and clog up the inlet. Such clogging would make mass production impossible, but applicants have discovered how to minimize heating of the slurry near the mold entrance during heating of the mold. This is accomplished by feeding the ceramic material through a supply tube into the bottom of the mold, passing a refrigerant through a cooling passage adjacent the upper end of said supply tube to maintain the slurry in the tube at low temperature, and minmizing the time for injection of the slurry by using high injection pressures. Thus, the slurry which has been refrigerated in the supply tube, is ready for injection in the next molding cycle without any cleaning of the mold entrance or the supply tube and the molding cycle may be repeated over and over again for long periods of time using semi-automatic equipment.

The most effective apparatus is an insulated slurry cell or vessel below the mold having insulated walls surrounding the vessel and passages for flow of refrigerant through the vessel to maintain the temperature of the ceramic slurry below 0° C. It is preferable to provide the vertical supply tube with an inner jacket extending at least the major portion of the length of the tube from a point near the top of the tube and with an outer jacket adjacent the peripheral walls of the vessel. The refrigerant which is preferably a liquefied gas having a boiling point below —20° C. is preferably passed from the refrigeration equipment (not shown) directly to the inner jacket so that the temperature of the refrigerant in the inner jacket is always below —20° C. It is preferable to cool the ceramic slurry in the supply tube so that its average temperature is between —75° C. and —20° C.

Because of the tendency of the heated mold to increase the temperature of the slurry at the upper end of the supply tube, it is desirable to provide the die with insulating means made of micarta or other suitable insulation or otherwise minimize the heat transfer from the die to the supply tube while rapidly removing the heat from the supply tube 56. The nozzle 61 and the die halves 18 and 19 cooperate to prevent heating of the ceramic material at the upper end of said supply tube. Since the metal nozzle is out of contact with the insulating members 71 above and below the O-ring 67, the heat transfer from the die halves to the nozzle is minimized. Since the nozzle is formed of metal, which conducts the heat rapidly to the refrigerant chamber 60, any ceramic material which remains in the nozzle and is not pulled by gravity back into the tube 56 is maintained at a low temperature even when the die halves are heated to a high temperature.

While the process of this invention may be performed using apparatus more simple than that shown in the drawing, as for example when modifying existing equipment, the highest rates of production can be obtained with automatic or semi-automatic equipment. It will be understood that the elements 135, 136 and 137 may be adjusted (or replaced) to provide different water temperatures in accordance with the type of article being made or to vary the rate of heating of the mold cavity. Likewise the refrigerant temperature maintained by the element 103 may be changed.

The timers $T_1$, $T_2$, $T_3$ and $T_4$ may be set to provide any desired time delay. The timer $T_2$ is set to open a predetermined time (i.e., 1 to 5 seconds) after the valve 105 is opened to initiate injection, such time preferably corresponding to that necessary to fill the die cavity as determined by previous tests. The timer $T_4$ is set to open a predetermined time (i.e., 0.5 to 2 minutes) later when the molded core has the necessary rigidity. This time is again determined by previous tests and is usually less than 3 minutes but may be 1 minute or less.

The ceramic material is preferably fed to the mold cavity from the vessel 52 in a few seconds (i.e., 1 to 3 seconds) under a high pressure. The pressure should be sufficient to force all of the residual air or gas out of the mold cavity and to fill the cavity completely with the ceramic slurry. The pressure is preferably 50 to 1200 pounds per square inch gage. Where fine detail and smooth surfaces are essential best results are usually obtained using an inert gas pressure of 100 to 600 pounds per square inch gage. The dies must, of course, be designed to withstand the pressure which is to be applied. If desired, the maximum pressure in the die cavity may be controlled by the hydraulic cylinders 11 and 16 which may yield to permit escape of air at the parting surfaces of the mold.

Where the context permits, the terms used in the specification and claims thereof have the same meaning as those used in said parent application Serial No. 276,753, which has been passed to issue, now Patent No. 3,222,435.

It will be understood that, in accordance with the provisions of the patent statutes, variations and modifications of the specific methods and machines disclosed herein may be made without departing from the spirit of the invention.

Having described our invention, we claim:

1. Apparatus for molding a ceramic core in a split die having two halves which fit together to form a mold cavity with an inlet opening formed by said halves comprising mold closing means for holding the die halves in closed operating position, a closed slurry-receiving vessel having insulating means surrounding the vessel to minimize heat transfer, a supply tube in said vessel extending from a point below the level of the slurry to the inlet opening of the die and communicating with the mold cavity, means for supplying a high pressure to said vessel to force the slurry through said tube into the mold cavity, sealing means for preventing gas from escaping from said vessel and for preventing leakage of ceramic material from the mold adjacent the discharge end of said tube, and refrigerating means for cooling the end of said tube adjacent the die and for simultaneously maintaining the temperature in said vessel below 0° C.

2. Apparatus as defined in claim 1 wherein a nozzle is provided at the discharge end of said supply tube, insulating means are provided at the inlet opening to said die to receive said nozzle, and means are provided for moving the nozzle out of contact with the die halves and out of the path of movement of one die half to permit opening of the die.

3. Apparatus for molding a ceramic mold part in a split die having two halves which fit together to form a mold cavity with a bottom inlet opening comprising, in combination, mold closing means for holding the die halves in a closed operating position, a closed slurry-receiving vessel mounted below the closed die and having insulating means surrounding the vessel to minimize heat transfer, an upright supply tube in said vessel extending from a point near the bottom of the vessel to the inlet opening of the closed die and communicating with the mold cavity formed by the closed die halves, means for supplying a gas under pressure to said vessel to apply pressure to the ceramic slurry in the vessel and to force the slurry upwardly through said tube into the mold cavity, sealing means for preventing gas from escaping from said vessel and for preventing leakage of ceramic material from the mold adjacent the upper end of said tube, and refrigerating means for cooling the upper part of said tube and for maintaining the temperature in said vessel below 0° C.

4. Apparatus for making a ceramic mold part in a mold having a bottom inlet opening comprising, in combination, a closed slurry-receiving vessel having relatively thick bottom and peripheral walls of insulating material, an upright tube in said vessel having a lower end portion below the normal level of the ceramic slurry in the vessel and an upper end portion projecting through the top wall of said vessel, means at the top of said tube for directing the ceramic slurry into the mold cavity, said last-named means being of a size to fit said mold and to prevent leakage of ceramic material from said tube during feeding of the ceramic slurry to the mold cavity, a gas in said vessel above the slurry, means for applying pressure to said gas to feed the slurry through said tube into the mold, control means for increasing and decreasing the pressure on said gas, passage means within the insulated walls surrounding said vessel having a liquefied refrigerant gas therein, and refrigerating means for liquefying said last-named gas and for circulating the refrigerant through said passage means to maintain the temperature of the ceramic slurry below 0° C.

5. Apparatus as defined in claim 4 wherein said passage means includes a cooling passage extending through the top portion of said vessel and located adjacent the upper end of said tube and wherein said refrigerating means maintains the temperature of the liquefied gas in said last-named cooling passage below −20° C.

6. Apparatus as defined in claim 4 wherein said passage means includes a cooling passage adjacent to and surrounding said tube and extending the major portion of the length of said tube from a point near the top of the tube, whereby the ceramic slurry in the top portion of the tube is effectively cooled.

7. Apparatus as defined in claim 4 wherein said passage means includes an inner jacket surrounding said tube and extending to the top of said tube and an outer jacket adjacent the peripheral wall of said vessel, and passage means for supplying refrigerant to said inner and outer jackets to maintain the ceramic slurry at a low temperature, said passage means supplying the refrigerant to the inner jacket at a temperature not in excess of −20° C.

8. Apparatus as defined in claim 4 wherein said means at the top of said tube comprises a nozzle having a discharge opening with a diameter materially less than the internal diameter of said tube, said nozzle having generally the same size and shape as the adjacent surfaces of said mold at the inlet opening and having an annular sealing ring for engaging said mold surfaces to prevent leakage of the ceramic material during injection and to hold the nozzle out of contact with said mold surfaces, thereby reducing the heat transfer to the nozzle.

9. Apparatus for molding a pattern from a ceramic slurry comprising a split die having a mold cavity with a bottom inlet opening, means for holding the die in a closed position, fluid passages in said die for receiving heating and cooling water, a source of cooling water, means for heating water to provide a source of heating fluid with a temperature of 50° to 150° C., valve means for alternatively connecting said passages with the sources of cooling water or the source of heating fluid to heat or cool the die, means for controlling said valve means, a closed slurry-receiving vessel mounted below the die, an outer shell having relatively thick peripheral walls of insulating material enclosing said vessel, an upright supply tube in said vessel extending through the top of said vessel for feeding the ceramic slurry from the bottom portion of said vessel to said mold cavity, a source of gas under pressure, a supply passage leading from said source to said vessel to apply pressure to the ceramic slurry in the vessel and to cause the slurry to move upwardly through said supply tube into the mold cavity, and means for refrigerating said vessel and said supply tube.

10. Apparatus as defined in claim 9 including control means for said valves for automatically connecting the passages of said die to said source of heating fluid to heat the die to a temperature of 40° to 150° C. a few seconds after the injection of ceramic material has been initiated, valve means for increasing and decreasing the pressure of the gas in the vessel to start and stop the feeding of the ceramic material, control means for automatically reducing the gas pressure a predetermined period of time after said gas injection is initiated, said last-named period being no more than about 3 minutes, and control means for automatically connecting the passages of said die to said source of cooling water before the ceramic material is injected into the die in a subsequent molding cycle.

11. Apparatus as defined in claim 3 wherein said mold closing means includes a swivel platen mounted to swing from a generally vertical operating position to a generally horizontal retracted position.

12. Apparatus as defined in claim 3 wherein said split die is mounted on said closing means and comprises metal mold halves having heating means thereon, a metal nozzle is provided at the discharge end of said supply tube, and insulating means are provided at the inlet opening of said die to receive said nozzle and to minimize the transfer of heat from the heated mold halves to the nozzle, the metal of said nozzle and said supply tube providing a high rate of heat transfer to said cooling means.

13. Apparatus as defined in claim 3 wherein said mold closing means comprises a pair of platens mounted to move toward and away from each other, one of said platens being mounted to swing from a generally vertical operating position to a generally horizontal retracted position when the mold is opened, said vessel and said supply tube being mounted on a carriage for limited movement whereby the upper portion of said tube which engages the mold at the inlet thereof moves out of engagement with the die half carried by the swivel platen to permit swinging of said platen, and means carried by the other platen for engaging the upper portion of said supply tube to move it back into engagement with said last-named die half when the mold is closed.

14. Apparatus as defined in claim 3 wherein an adjustable stop is provided and yieldable means are provided for biasing said carriage toward a position against said stop wherein the upper portion of said supply tube cannot interfere with swinging of the swivel platen, and means for adjusting said stop to permit use of substitute molds of different sizes without adjustment of the swivel platen.

15. Apparatus for molding a ceramic article from a ceramic slurry comprising finely comminuted refractory particles and a binder for said particles, said apparatus comprising a split die having two halves which fit together to form a mold cavity, motor means for moving said die halves to open and close the die, fluid passages in said die halves for carrying heating and cooling fluid, a first source of heating fluid, a second source of cooling fluid, fluid valve means having a first position in which heating fluid is directed from said first source to said fluid passages and a second position in which cooling fluid is directed from said second source to said fluid passages, means responsive to the temperature in said mold cavity for maintaining said temperature between 50° C. and 150° C. when heating fluid is directed to said cavity, a closed insulated vessel mounted below the closed die and enclosing said ceramic slurry, an upright supply tube in said vessel extending through the top of said vessel between the inlet to said mold cavity and the bottom portion of said vessel for feeding the ceramic slurry to said mold cavity, a source of dry gas under high pressure, a gas passage leading from said last-named source to said vessel, gas valve means for cutting off the flow of said gas through said gas passage to said vessel, venting means for reducing the gas pressure in said vessel, refrigerating means maintaining the temperature of said slurry in said vessel between −75° C. and 0° C., control means for opening said gas valve means to supply gas to said vessel at a pressure of at least 25 pounds per square inch gage and to initiate rapid flow of the ceramic slurry upwardly through said supply tube, means for preventing opening of said gas valve means by said control means until the die is fully closed, control means for automatically closing said gas valve means and for moving said fluid valve means from said second to said first position to effect heating of the mold a short predetermined period of time after said rapid flow is initiated when the mold cavity is completely filled with ceramic material, and control means for automatically opening said venting means a predetermined period of time not in excess of 2 minutes after said rapid flow is initiated to reduce the pressure in said vessel and to permit gravity flow of the ceramic material in said supply tube, means responsive to the pressure in said vessel for preventing opening of said die by said motor means until the pressure in said vessel is below a predetermined amount, and means for automatically initiating the flow of cooling fluid through said die before the die is again closed and filled with ceramic material.

16. Apparatus for molding a ceramic mold part comprising a split die having two metal mold halves which fit together to form a mold cavity and an inlet opening leading to said cavity, a closed slurry-receiving vessel having insulating means surrounding the vessel to minimize heat transfer, a metal supply tube extending from said vessel to said inlet opening, means for applying pressure to the slurry to force the slurry through said supply tube to said mold cavity, refrigerating means for maintaining the temperature of the slurry in said vessel below 0° C. including a refrigerant passage near the discharge end of said supply tube for maintaining the temperature of said supply tube below 0° C., means forming said inlet opening and made of an insulating material for reducing the heat flow from said mold halves to said supply tube and for separating the heated metal parts of the mold halves from the supply tube, and means at the discharge end of said supply passage formed of a heat-conductive metal for rapidly transferring heat from said discharge end to said refrigerant passage, whereby said discharge end of the supply passage is maintained at a low temperature during heating of said mold halves.

17. A combination as defined in claim 16 wherein the discharge end of said supply tube is a metal nozzle having a discharge opening at its outer end with a diameter less than the diameter of said supply tube inwardly of said nozzle, said nozzle being shaped to fit the inlet opening of said split die with a small clearance space between the die and the periphery of the nozzle, and an O-ring of elastic material is located in the clearance space to seal the inlet opening while holding the nozzle out of contact with the heated mold halves to minimize heat transfer.

References Cited
UNITED STATES PATENTS

| | | | |
|---|---|---|---|
| 2,183,983 | 12/1939 | Bostwick | 18—16 |
| 2,847,739 | 8/1958 | Sylvester | 22—69 |
| 3,163,897 | 1/1965 | Sylvester | 22—69 |

WILLIAM J. STEPHENSON, *Primary Examiner.*